(12) United States Patent
Haynie et al.

(10) Patent No.: US 12,306,758 B2
(45) Date of Patent: May 20, 2025

(54) ADDRESS BASED HARDWARE SNOOP LOGIC WITH CONFIGURABLE SNOOPABLE SPACE SETTINGS FOR HARDWARE ASSIST

(71) Applicant: International Business Machines Corporation, Armonk, NY (US)

(72) Inventors: Howard Michael Haynie, Wappingers Falls, NY (US); Michael James Becht, Poughkeepsie, NY (US); Mushfiq Us Saleheen, Poughkeepsie, NY (US); Dan Vangor, Mahopac, NY (US); Girish Gopala Kurup, Bangalore (IN); Luke Hopkins, Peterborough, NH (US); Bruce Ratcliff, Red Hook, NY (US)

(73) Assignee: International Business Machines Corporation, Armonk, NY (US)

(*) Notice: Subject to any disclaimer, the term of this patent is extended or adjusted under 35 U.S.C. 154(b) by 63 days.

(21) Appl. No.: 18/498,863

(22) Filed: Oct. 31, 2023

(65) Prior Publication Data

US 2025/0139009 A1    May 1, 2025

(51) Int. Cl.
*G06F 12/0831* (2016.01)
*G06F 12/123* (2016.01)

(52) U.S. Cl.
CPC ........ *G06F 12/0835* (2013.01); *G06F 12/123* (2013.01)

(58) Field of Classification Search
None
See application file for complete search history.

(56) References Cited

U.S. PATENT DOCUMENTS

| | | | |
|---|---|---|---|
| 8,200,796 B1* | 6/2012 | Margulis | H04N 21/4122 709/217 |
| 8,255,638 B2 | 8/2012 | Blumrich et al. | |
| 10,409,744 B1* | 9/2019 | Gross | G06F 1/3287 |
| 2008/0244193 A1* | 10/2008 | Sistla | G06F 12/0835 711/146 |

(Continued)

OTHER PUBLICATIONS

International Searching Authority, "Notification of Transmittal of the International Search Report and the Written Opinion of the International Searching Authority, or Declaration," Patent Cooperation Treaty, Dec. 11, 2024, 9 pages, International Application No. PCT/IB2024/058970.

(Continued)

*Primary Examiner* — Edward J Dudek, Jr.
*Assistant Examiner* — Ralph A Verderamo, III
(74) *Attorney, Agent, or Firm* — Patterson + Sheridan, LLP

(57) ABSTRACT

Systems and techniques for snooping input/output (I/O) events in a computing system are described. An example technique includes obtaining a configuration comprising a plurality of snoop space profiles, each snoop space profile indicating a respective range of memory addresses that map to a respective completion queue. The technique also includes monitoring input/output (I/O) traffic exchanged across a communication interface between an I/O adapter and a processor in a computing system, based on the configuration. The technique further includes performing one or more actions to assist processing of the I/O traffic, based in part on the monitoring.

20 Claims, 5 Drawing Sheets

(56) References Cited

U.S. PATENT DOCUMENTS

2018/0287900 A1* 10/2018 Pang .................. H04L 43/12
2025/0004829 A1* 1/2025 Leijten ................ G06F 9/4881

OTHER PUBLICATIONS

Shanon et al. "Using Reconfigurability to Achieve Real-Time Profiling for Hardware/Software Codesign" Department of Electrical and Computer Engineering University of Toronto, Feb. 2004, pp. 190-199.

Shanon Lesley. "Simplifying System-on-Chip Design through Architecture and System CAD Tools" Department of Electrical and Computer Engineering University of Toronto, 2006, 211 pages.

* cited by examiner

ADDRESS BASED HARDWARE SNOOP LOGIC WITH CONFIGURABLE SNOOPABLE SPACE SETTINGS FOR HARDWARE ASSIST

BACKGROUND

The present invention relates to computing systems, and more specifically, to a hardware-based controller for snooping input/output (I/O) events in a computing system.

A large majority of the work in a computing system involves data input, data output, or a combination of data input and data output. In such computing systems, the operating system is generally responsible for providing I/O management for a variety of I/O devices, such as disks, tapes, printers, network cards (or connections), and audio I/O, as illustrative, non-limiting examples. I/O management may include programmed I/O methods, interrupt-based I/O methods, or direct memory access (DMA) I/O methods.

In a programmed I/O method, each I/O device connected to the computing system is periodically checked (e.g., polled) for inputs. Once the computing system receives an input signal from a device, the computing system may carry out that request until it no longer receives an input signal. Interrupt-based I/O methods generally allow the processor (e.g., central processing unit (CPU)) to continue to process other work and be interrupted when an input signal is received from an I/O device. DMA I/O methods generally allow for transferring blocks of data between the memory and I/O devices without having to involve the processor.

As modern computing systems evolve to support an ever increasing number of I/O devices, it is becoming increasingly difficult to provide efficient I/O management with conventional techniques.

SUMMARY

One embodiment described herein is a computer-implemented method. The computer-implemented method includes obtaining a configuration comprising a plurality of snoop space profiles, each snoop space profile indicating a respective range of memory addresses that map to a respective completion queue. The computer-implemented method also includes monitoring input/output (I/O) traffic exchanged across a communication interface between an I/O adapter and a processor in a computing system, based on the configuration. The computer-implemented method further includes performing one or more actions to assist processing of the I/O traffic, based in part on the monitoring.

Another embodiment described herein is a computer-readable storage medium. The computer-readable storage medium has computer-readable program code embodied therewith. The computer-readable program code is executable by one or more computer processors to perform an operation. The operation includes obtaining a configuration comprising a plurality of snoop space profiles, each snoop space profile indicating a respective range of memory addresses that map to a respective completion queue. The operation also includes monitoring input/output (I/O) traffic exchanged across a communication interface between an I/O adapter and a processor in a computing system, based on the configuration. The operation further includes performing one or more actions to assist processing of the I/O traffic, based in part on the monitoring.

Another embodiment described herein is a computing system. The computing system includes one or more memories, an input/output (I/O) adapter, and one or more processors coupled to the one or more memories and the I/O adapter. The one or more processors are individually or collectively configured to perform an operation. The operation includes obtaining a configuration comprising a plurality of snoop space profiles, each snoop space profile indicating a respective range of memory addresses that map to a respective completion queue. The operation also includes monitoring input/output (I/O) traffic exchanged across a communication interface between the I/O adapter and the processor, based on the configuration. The operation further includes performing one or more actions to assist processing of the I/O traffic, based in part on the monitoring.

DETAILED DESCRIPTION

Figure 1:
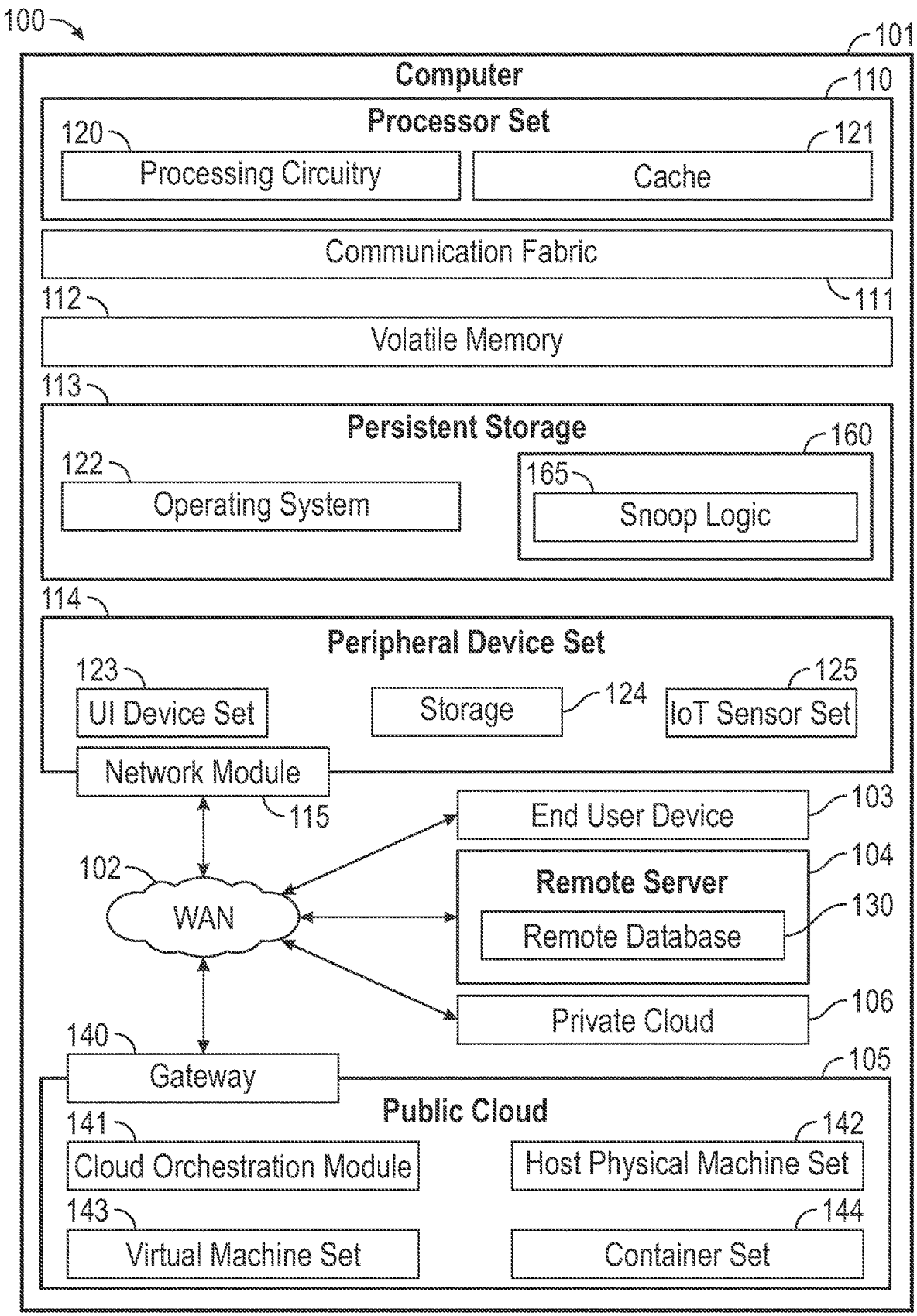
FIG. 1 is a block diagram of a computing environment, according to one embodiment.

The descriptions of the various embodiments of the present invention have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

In the following, reference is made to embodiments presented in this disclosure. However, the scope of the present disclosure is not limited to specific described embodiments. Instead, any combination of the following features and elements, whether related to different embodiments or not, is contemplated to implement and practice contemplated embodiments. Furthermore, although embodiments disclosed herein may achieve advantages over other possible solutions or over the prior art, whether or not a particular advantage is achieved by a given embodiment is not limiting of the scope of the present disclosure. Thus, the following aspects, features, embodiments and advantages are merely illustrative and are not considered elements or limitations of the appended claims except where explicitly recited in a claim(s). Likewise, reference to "the invention" shall not be construed as a generalization of any inventive subject matter disclosed herein and shall not be considered to be an element or limitation of the appended claims except where explicitly recited in a claim(s).

Aspects of the present invention may take the form of an entirely hardware embodiment, an entirely software embodiment (including firmware, resident software, micro-code, etc.) or an embodiment combining software and hardware aspects that may all generally be referred to herein as a "circuit," "module" or "system."

Various aspects of the present disclosure are described by narrative text, flowcharts, block diagrams of computer systems and/or block diagrams of the machine logic included in computer program product (CPP) embodiments. With respect to any flowcharts, depending upon the technology involved, the operations can be performed in a different order than what is shown in a given flowchart. For example, again depending upon the technology involved, two operations shown in successive flowchart blocks may be performed in reverse order, as a single integrated step, concurrently, or in a manner at least partially overlapping in time.

A computer program product embodiment ("CPP embodiment" or "CPP") is a term used in the present disclosure to describe any set of one, or more, storage media (also called "mediums") collectively included in a set of one, or more, storage devices that collectively include machine readable code corresponding to instructions and/or data for performing computer operations specified in a given CPP claim. A "storage device" is any tangible device that can retain and store instructions for use by a computer processor. Without limitation, the computer readable storage medium may be an electronic storage medium, a magnetic storage medium, an optical storage medium, an electromagnetic storage medium, a semiconductor storage medium, a mechanical storage medium, or any suitable combination of the foregoing. Some known types of storage devices that include these mediums include: diskette, hard disk, random access memory (RAM), read-only memory (ROM), erasable programmable read-only memory (EPROM or Flash memory), static random access memory (SRAM), compact disc read-only memory (CD-ROM), digital versatile disk (DVD), memory stick, floppy disk, mechanically encoded device (such as punch cards or pits/lands formed in a major surface of a disc) or any suitable combination of the foregoing. A computer readable storage medium, as that term is used in the present disclosure, is not to be construed as storage in the form of transitory signals per se, such as radio waves or other freely propagating electromagnetic waves, electromagnetic waves propagating through a waveguide, light pulses passing through a fiber optic cable, electrical signals communicated through a wire, and/or other transmission media. As will be understood by those of skill in the art, data is typically moved at some occasional points in time during normal operations of a storage device, such as during access, de-fragmentation or garbage collection, but this does not render the storage device as transitory because the data is not transitory while it is stored.

Computing environment 100 contains an example of an environment for the execution of at least some of the computer code involved in performing the inventive methods, such as block 160, which includes snoop logic 165 configured to snoop I/O events that occur within a computing system. In addition to block 160, computing environment 100 includes, for example, computer 101, wide area network (WAN) 102, end user device (EUD) 103, remote server 104, public cloud 105, and private cloud 106. In this embodiment, computer 101 includes processor set 110 (including processing circuitry 120 and cache 121), communication fabric 111, volatile memory 112, persistent storage 113 (including operating system 122 and block 160, as identified above), peripheral device set 114 (including user interface (UI) device set 123, storage 124, and Internet of Things (IoT) sensor set 125), and network module 115. Remote server 104 includes remote database 130. Public cloud 105 includes gateway 140, cloud orchestration module 141, host physical machine set 142, virtual machine set 143, and container set 144.

COMPUTER 101 may take the form of a desktop computer, laptop computer, tablet computer, smart phone, smart watch or other wearable computer, mainframe computer, quantum computer or any other form of computer or mobile device now known or to be developed in the future that is capable of running a program, accessing a network or querying a database, such as remote database 130. As is well understood in the art of computer technology, and depending upon the technology, performance of a computer-implemented method may be distributed among multiple computers and/or between multiple locations. On the other hand, in this presentation of computing environment 100, detailed discussion is focused on a single computer, specifically computer 101, to keep the presentation as simple as possible. Computer 101 may be located in a cloud, even though it is not shown in a cloud in FIG. 1. On the other hand, computer 101 is not required to be in a cloud except to any extent as may be affirmatively indicated.

PROCESSOR SET 110 includes one, or more, computer processors of any type now known or to be developed in the future. Processing circuitry 120 may be distributed over multiple packages, for example, multiple, coordinated integrated circuit chips. Processing circuitry 120 may implement multiple processor threads and/or multiple processor cores. Cache 121 is memory that is located in the processor chip package(s) and is typically used for data or code that should be available for rapid access by the threads or cores running on processor set 110. Cache memories are typically organized into multiple levels depending upon relative proximity to the processing circuitry. Alternatively, some, or all, of the cache for the processor set may be located "off chip." In some computing environments, processor set 110 may be designed for working with qubits and performing quantum computing.

Computer readable program instructions are typically loaded onto computer 101 to cause a series of operational steps to be performed by processor set 110 of computer 101 and thereby effect a computer-implemented method, such that the instructions thus executed will instantiate the methods specified in flowcharts and/or narrative descriptions of computer-implemented methods included in this document (collectively referred to as "the inventive methods"). These computer readable program instructions are stored in various types of computer readable storage media, such as cache 121 and the other storage media discussed below. The program instructions, and associated data, are accessed by processor set 110 to control and direct performance of the inventive methods. In computing environment 100, at least some of the instructions for performing the inventive methods may be stored in block 160 in persistent storage 113.

COMMUNICATION FABRIC 111 is the signal conduction path that allows the various components of computer 101 to communicate with each other. Typically, this fabric is made of switches and electrically conductive paths, such as the switches and electrically conductive paths that make up busses, bridges, physical input/output ports and the like. Other types of signal communication paths may be used, such as fiber optic communication paths and/or wireless communication paths.

VOLATILE MEMORY 112 is any type of volatile memory now known or to be developed in the future. Examples include dynamic type random access memory (RAM) or static type RAM. Typically, volatile memory 112 is characterized by random access, but this is not required unless affirmatively indicated. In computer 101, the volatile memory 112 is located in a single package and is internal to computer 101, but, alternatively or additionally, the volatile memory may be distributed over multiple packages and/or located externally with respect to computer 101.

PERSISTENT STORAGE 113 is any form of non-volatile storage for computers that is now known or to be developed in the future. The non-volatility of this storage means that the stored data is maintained regardless of whether power is being supplied to computer 101 and/or directly to persistent storage 113. Persistent storage 113 may be a read only memory (ROM), but typically at least a portion of the persistent storage allows writing of data, deletion of data and re-writing of data. Some familiar forms of persistent storage include magnetic disks and solid state storage devices. Operating system 122 may take several forms, such as various known proprietary operating systems or open source Portable Operating System Interface-type operating systems that employ a kernel. The code included in block 160 typically includes at least some of the computer code involved in performing the inventive methods.

PERIPHERAL DEVICE SET 114 includes the set of peripheral devices of computer 101. Data communication connections between the peripheral devices and the other components of computer 101 may be implemented in various ways, such as Bluetooth connections, Near-Field Communication (NFC) connections, connections made by cables (such as universal serial bus (USB) type cables), insertion-type connections (for example, secure digital (SD) card), connections made through local area communication networks and even connections made through wide area networks such as the internet. In various embodiments, UI device set 123 may include components such as a display screen, speaker, microphone, wearable devices (such as goggles and smart watches), keyboard, mouse, printer, touchpad, game controllers, and haptic devices. Storage 124 is external storage, such as an external hard drive, or insertable storage, such as an SD card. Storage 124 may be persistent and/or volatile. In some embodiments, storage 124 may take the form of a quantum computing storage device for storing data in the form of qubits. In embodiments where computer 101 is required to have a large amount of storage (for example, where computer 101 locally stores and manages a large database) then this storage may be provided by peripheral storage devices designed for storing very large amounts of data, such as a storage area network (SAN) that is shared by multiple, geographically distributed computers. IoT sensor set 125 is made up of sensors that can be used in Internet of Things applications. For example, one sensor may be a thermometer and another sensor may be a motion detector.

NETWORK MODULE 115 is the collection of computer software, hardware, and firmware that allows computer 101 to communicate with other computers through WAN 102. Network module 115 may include hardware, such as modems or Wi-Fi signal transceivers, software for packetizing and/or de-packetizing data for communication network transmission, and/or web browser software for communicating data over the internet. In some embodiments, network control functions and network forwarding functions of network module 115 are performed on the same physical hardware device. In other embodiments (for example, embodiments that utilize software-defined networking (SDN)), the control functions and the forwarding functions of network module 115 are performed on physically separate devices, such that the control functions manage several different network hardware devices. Computer readable program instructions for performing the inventive methods can typically be downloaded to computer 101 from an external computer or external storage device through a network adapter card or network interface included in network module 115.

WAN 102 is any wide area network (for example, the internet) capable of communicating computer data over non-local distances by any technology for communicating computer data, now known or to be developed in the future. In some embodiments, the WAN 102 may be replaced and/or supplemented by local area networks (LANs) designed to communicate data between devices located in a local area, such as a Wi-Fi network. The WAN and/or LANs typically include computer hardware such as copper transmission cables, optical transmission fibers, wireless transmission, routers, firewalls, switches, gateway computers and edge servers.

END USER DEVICE (EUD) 103 is any computer system that is used and controlled by an end user (for example, a customer of an enterprise that operates computer 101), and may take any of the forms discussed above in connection with computer 101. EUD 103 typically receives helpful and useful data from the operations of computer 101. For example, in a hypothetical case where computer 101 is designed to provide a recommendation to an end user, this recommendation would typically be communicated from network module 115 of computer 101 through WAN 102 to EUD 103. In this way, EUD 103 can display, or otherwise present, the recommendation to an end user. In some embodiments, EUD 103 may be a client device, such as thin client, heavy client, mainframe computer, desktop computer and so on.

REMOTE SERVER 104 is any computer system that serves at least some data and/or functionality to computer 101. Remote server 104 may be controlled and used by the same entity that operates computer 101. Remote server 104 represents the machine(s) that collect and store helpful and useful data for use by other computers, such as computer 101. For example, in a hypothetical case where computer 101 is designed and programmed to provide a recommendation based on historical data, then this historical data may be provided to computer 101 from remote database 130 of remote server 104.

PUBLIC CLOUD 105 is any computer system available for use by multiple entities that provides on-demand availability of computer system resources and/or other computer capabilities, especially data storage (cloud storage) and computing power, without direct active management by the user. Cloud computing typically leverages sharing of resources to achieve coherence and economics of scale. The direct and active management of the computing resources of public cloud 105 is performed by the computer hardware and/or software of cloud orchestration module 141. The computing resources provided by public cloud 105 are typically implemented by virtual computing environments that run on various computers making up the computers of host physical machine set 142, which is the universe of physical computers in and/or available to public cloud 105. The virtual computing environments (VCEs) typically take the form of virtual machines from virtual machine set 143 and/or containers from container set 144. It is understood that these VCEs may be stored as images and may be transferred among and between the various physical machine hosts, either as images or after instantiation of the VCE. Cloud orchestration module 141 manages the transfer and storage of images, deploys new instantiations of VCEs and manages active instantiations of VCE deployments.

Gateway 140 is the collection of computer software, hardware, and firmware that allows public cloud 105 to communicate through WAN 102.

Some further explanation of virtualized computing environments (VCEs) will now be provided. VCEs can be stored as "images." A new active instance of the VCE can be instantiated from the image. Two familiar types of VCEs are virtual machines and containers. A container is a VCE that uses operating-system-level virtualization. This refers to an operating system feature in which the kernel allows the existence of multiple isolated user-space instances, called containers. These isolated user-space instances typically behave as real computers from the point of view of programs running in them. A computer program running on an ordinary operating system can utilize all resources of that computer, such as connected devices, files and folders, network shares, CPU power, and quantifiable hardware capabilities. However, programs running inside a container can only use the contents of the container and devices assigned to the container, a feature which is known as containerization.

PRIVATE CLOUD 106 is similar to public cloud 105, except that the computing resources are only available for use by a single enterprise. While private cloud 106 is depicted as being in communication with WAN 102, in other embodiments a private cloud may be disconnected from the internet entirely and only accessible through a local/private network. A hybrid cloud is a composition of multiple clouds of different types (for example, private, community or public cloud types), often respectively implemented by different vendors. Each of the multiple clouds remains a separate and discrete entity, but the larger hybrid cloud architecture is bound together by standardized or proprietary technology that enables orchestration, management, and/or data/application portability between the multiple constituent clouds. In this embodiment, public cloud 105 and private cloud 106 are both part of a larger hybrid cloud.

Note, to clearly point out novel features of the present invention, the following discussion omits or only briefly describes conventional features of data processing systems which are apparent to those skilled in the art. It is assumed that those skilled in the art are familiar with the general architecture of processors, and in particular with processors which operate in an in-order dispatch, out-of-order execution, or in-order completion fashion. It may be noted that a numbered element is numbered according to the figure in which the element is introduced, and is referred to by that number throughout succeeding figures. Additionally, as used herein, a hyphenated form of a reference numeral refers to a specific instance of an element and the un-hyphenated form of the reference numeral refers to the collective element. Thus, for example, device "12-1" refers to an instance of a device class, which may be referred to collectively as devices "12" and any one of which may be referred to generically as a device "12".

Figure 2:
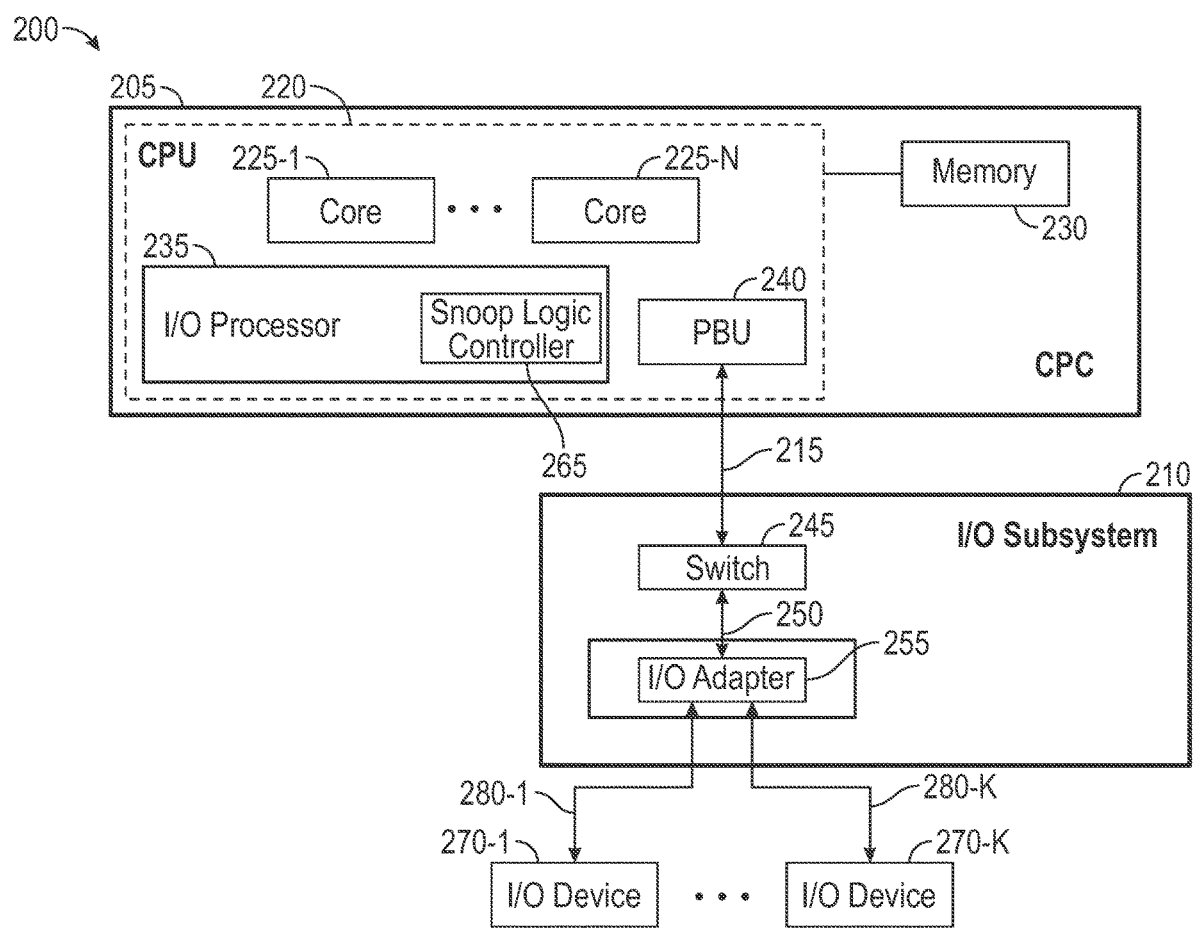
FIG. 2 is a diagram of an example computing system, according to one embodiment.

FIG. 2 is a diagram of an example computing system 200, according to one embodiment. The features described with respect to the computing system 200 may be used in conjunction with other embodiments described herein. For example, the computing system 200 may be implemented within the computing environment 100 depicted in FIG. 1. For instance, the computing system 200 may represent one example implementation of the computer 101 in FIG. 1. In certain embodiments, the computing system 200 may be implemented as a mainframe computer. However, other implementations of the computing system 200 are also contemplated.

The computing system 200 includes, without limitation, a central processing complex (CPC) 205 that is communicatively coupled with I/O subsystem 210, which is communicatively coupled to one or more I/O devices 270 1-K. The CPC 205 includes a central processing unit (CPU) 220 and a memory 230, which may include volatile memory, persistent storage, or a combination thereof. The CPU 220 includes multiple processor cores 225 1-N having any suitable implementation.

The CPU 220 also includes an I/O processor 235, which is communicatively coupled with the processor cores 225 1-N. In certain embodiments, the CPU 220 further includes a peripheral component interconnect express (PCIe) bridge unit (PBU) 240 that is communicatively coupled with the I/O processor 235 and with the I/O subsystem 210. The I/O processor 235 includes a snoop logic controller 265 that is configured to monitor traffic that is exchanged between the CPC 205 and the I/O subsystem 210, snoop certain I/O events that occur within the traffic, and process the I/O events. The snoop logic controller 265 may include hardware, software, or a combination thereof. In certain embodiments, the snoop logic controller 265 is configured to implement snoop logic 165, described in greater detail herein. Note that while various components are described as being included in the CPU 220, alternate embodiments may have different arrangements of the components within the CPC 205. For example, the I/O processor 235 may be implemented separate from the CPU in certain embodiments.

The I/O subsystem 210 includes a switch 245 that is communicatively coupled to the PBU 240 via communication link(s) 215, and to I/O adapter(s) 255 of the I/O subsystem 210 via communication link(s) 250. The communication links 215, 250 are implemented using one or more conductors in any suitable form (e.g., conductive traces or wires). In one non-limiting example, the communication links 215, 250 each include an 8-lane PCIe connection, where each of the lanes includes a respective two conductors. Note, however, that other configurations of the communication links 215, 250, which may include the use of different protocols, are also contemplated. The I/O adapter(s) 255 connects the computing system 200 to one or more I/O devices 270, examples of which may include network interface cards (NICs) (also known as network cards), storage devices, and printers, as illustrative, non-limiting examples. In certain embodiments, one or more of the I/O adapters 255 may connect the computing system to an external network (not shown) (e.g., storage area network (SAN) having one or more storage devices), using any suitable technology such as Ethernet.

The computing system 200 (more specifically, the I/O processor 235) defines multiple channels 280 (or communication paths) between the CPC 205 and I/O devices 270. Each channel 280 is assigned a distinct channel path identifier (CHPID), which may represent a physical channel port location (PCHID), a logical channel subsystem, or a combination thereof. In certain embodiments, the channels 280 established by the I/O processor 235 are virtualized, so that any operating system instance executing on one of the processor cores 225 1-N is able to access any channel.

The architecture of the computing system 200, and more specifically the use of the I/O processor 235 within the CPC 205, provides a number of benefits. In general terms, the computing system 200 provides a more efficient operation reflecting updates to the architecture of the CPC 205. For instance, providing the I/O processor 235 within the CPC 205 shortens a path length from the processor cores 225 1-N to the I/O functionality, supporting greater throughput and responsiveness. The I/O processor 235 may be reconfigured and therefore adaptable to new types of communication links used by the I/O subsystem 210. Additionally, use of the I/O processor 235 allows new types of I/O adapters 255 to be integrated into the computing system 200 without requiring development of custom interface hardware in the I/O subsystem 210 (e.g., implementing using a unique ASIC and I/O card). In this way, the overall cost of the computing system 200 and/or its power consumption may be reduced.

Figure 3:
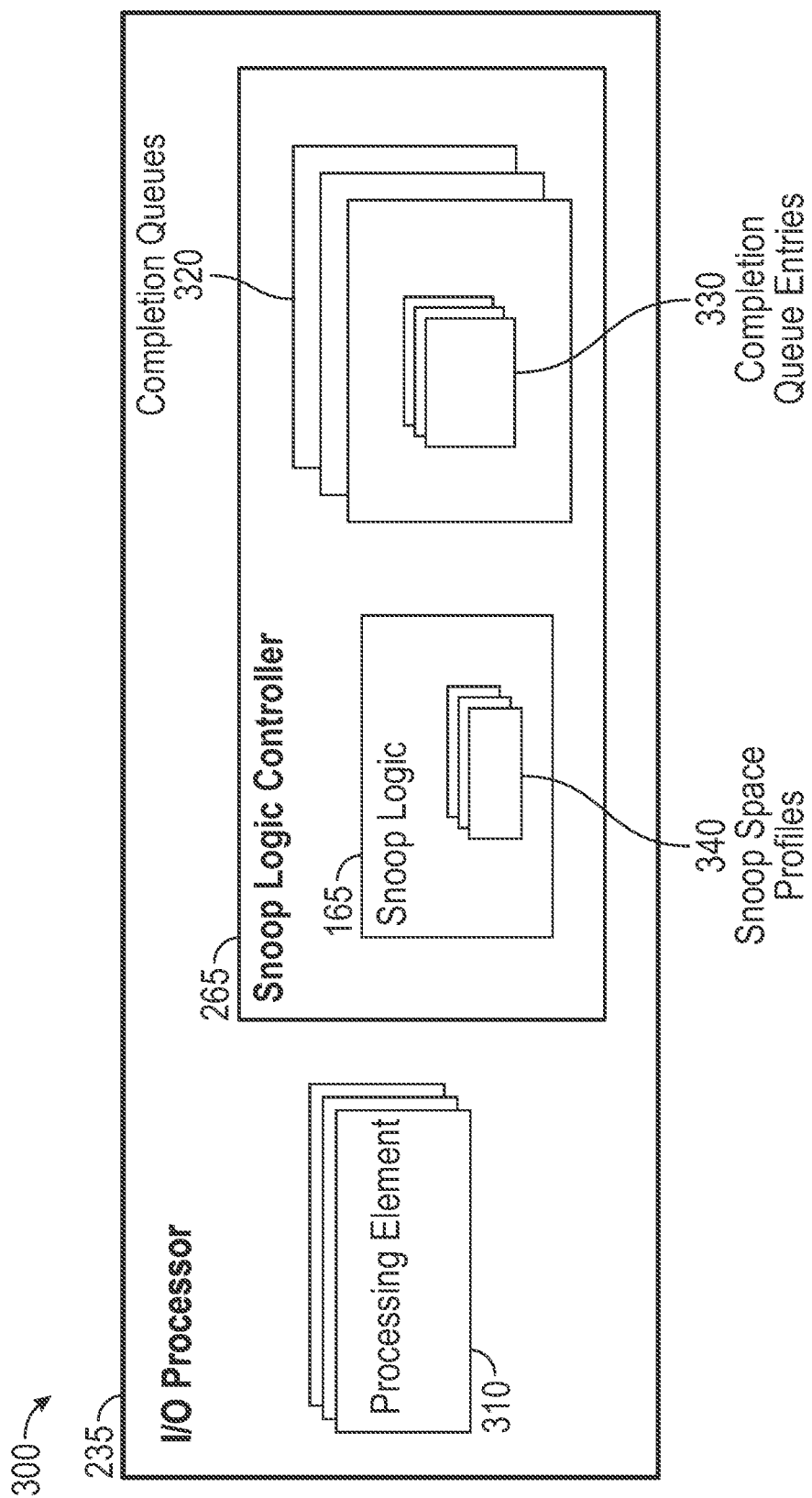
FIG. 3 is a diagram further illustrating certain components of the computing system depicted in FIG. 2, according to one embodiment.

FIG. 3 further illustrates certain components of the computing system 200 depicted in FIG. 2, according to one embodiment. As shown, the I/O processor 235 of the computing system 200 includes, without limitation, one or more processing elements 310 and the snoop logic controller 265. The one or more processing elements 310 generally provide connectivity for the channels 280 as well as implement protocols on the channels 280. The processing elements 310. The processing elements 310 may have any suitable implementation. In one non-limiting example, the processing elements 310 implement the RISC-V instruction set architecture, which allows the processing elements 310 to be dynamically updated to support new features and/or functions, as well as to provide functionality beyond the operations discussed above.

The snoop logic controller 265 includes, without limitation, snoop logic 165 and one or more completion queues 320. Each completion queue 320 generally holds events that indicate the completion of data transfer operations. For example, a completion queue 320 may include one or more completion queue entries 330, where each completion queue entry 330 includes information (e.g., status, size, etc.) about a completed work request.

In general, when a transmit or receive adapter operation completes, a completion event is generated. In conventional systems, the network adapter places this event in a completion queue entry 330 on a completion queue 320, and the network device driver (e.g., operating system 122) generally has to monitor and process the completion queue entries in order to process the completion events. However, in some instances, the monitoring and processing of completion queue entries can lead to cache thrashing, since the network device driver has to interact with the network adapter to determine when completion queue entries are written, and read the memory areas being written by the network adapter in order to process the completion queue entries.

To address this, in certain embodiments, the snoop logic controller 265 includes snoop logic 165, which is configured to snoop certain I/O events that occur in the computing system. In particular, the snoop logic 165 can detect in hardware when the network adapter (e.g., I/O adapter 255) writes entries to a completion queue 320. Upon detecting that an entry has been written to a completion queue 320, the snoop logic 165 can send an indication to the network device driver (e.g., operating system 122) that a new completion queue entry has been written. In certain embodiments, the network device driver may receive the indication before the I/O adapter completes the completion queue entry.

As shown in FIG. 3, in certain embodiments, the snoop logic 165 is configured with one or more snoop space profiles 340. Each snoop space profile 340 is associated with a defined memory area (or range of memory addresses), which maps to a respective completion queue 320. For example, each snoop space profile 340 may include a number of bits that defines a respective memory range for completion events. In one exemplary implementation, each snoop space profile 340 includes a 15 bit space offset and 17 bit size. In certain aspects, a first set of the snoop space profiles 340 may be used for transmit adapter operations (e.g., data being transferred from an I/O device 270) and a second set of the snoop space profiles 340 may be used for receive adapter operations (e.g., data being transferred to an I/O device 270).

Once the snoop logic 165 is configured with the snoop space profiles 340, the snoop logic 165 can monitor each write by the I/O adapter 255 into the memory areas indicated by the snoop space profiles 340. As part of the monitoring, the snoop logic 165 can compare the incoming store address with each snoop space profile 340 to determine whether the address is within the memory range defined by the snoop space profile 340. If the address does not fall within the memory range, then snoop logic 165 may refrain from performing an assist function (e.g., the completion queue entry may be written to without an assist).

On the other hand, if the address does fall within the memory range, the snoop logic 165 may determine a type of assist function associated with the memory range. Such assist function types may include sending a notification comprising information about the completion queue entry, triggering a counter, invoking a timer, and using an arrival algorithm, as illustrative, non-limiting examples. In certain embodiments, the snoop logic 165 may determine the type of assist function, based on the completion queue entry. For example, the completion queue entry may include an element that indicates the type of assist function.

Upon determining the type of assist function, the snoop logic 165 may trigger firmware (e.g., I/O processor 235) in the computing system to perform the assist function. In this manner, the snoop logic 165 can improve the performance of the computing system by enabling firmware to avoid polling the memory location associated with the completion queue entry and by enabling the I/O adapter 255 to avoid writing an interrupt.

Figure 4:
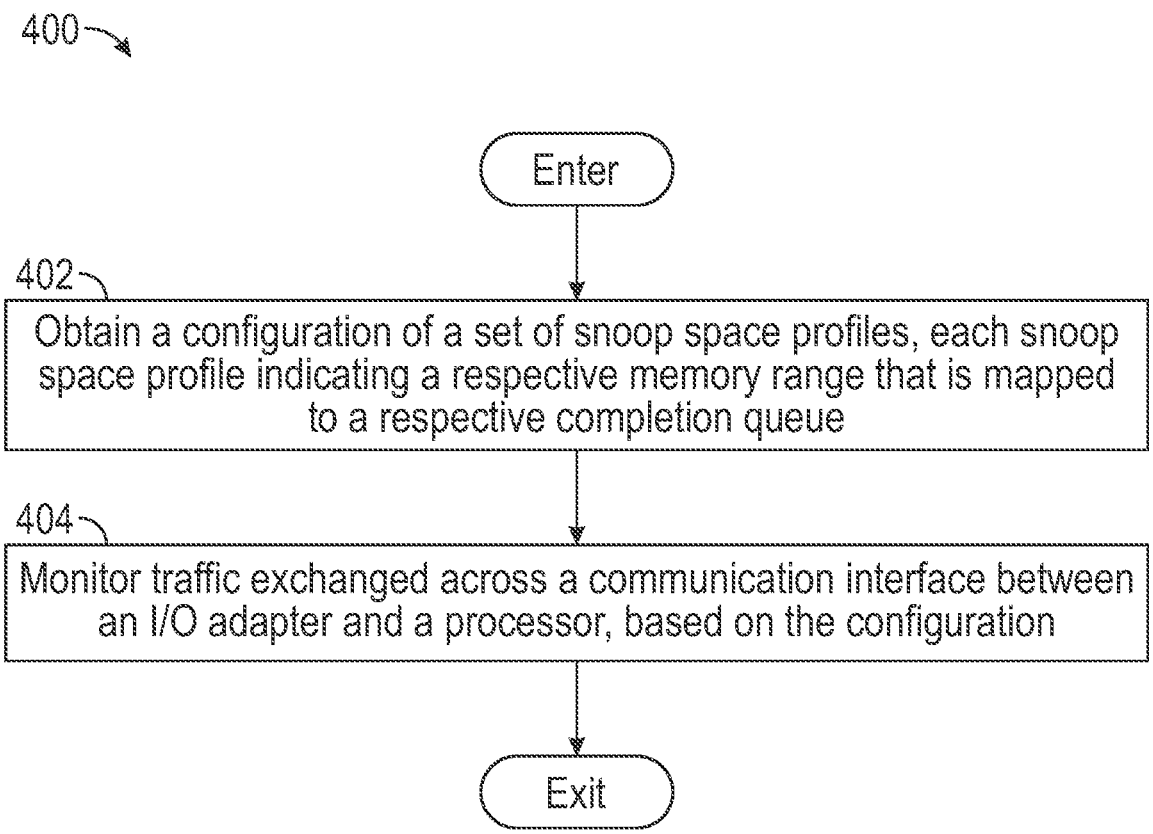
FIG. 4 is a flowchart of a method for snooping input/output (I/O) events in a computing system.

FIG. 4 is a flowchart of a method 400 for snooping I/O events in a computing system. The method 400 may be performed by a snoop logic controller (e.g., snoop logic controller 265).

Method 400 enters at block 402, where the snoop logic controller obtains a configuration of a set of snoop space profiles (e.g., snoop space profiles 340). Each snoop space profile indicates a respective memory range that is mapped to a respective completion queue. At block 404, the snoop logic controller monitors traffic exchanged across a communication interface (e.g., communication interface 215) between an I/O adapter (e.g., I/O adapter 255) and a processor (e.g., CPU 220).

Figure 5:
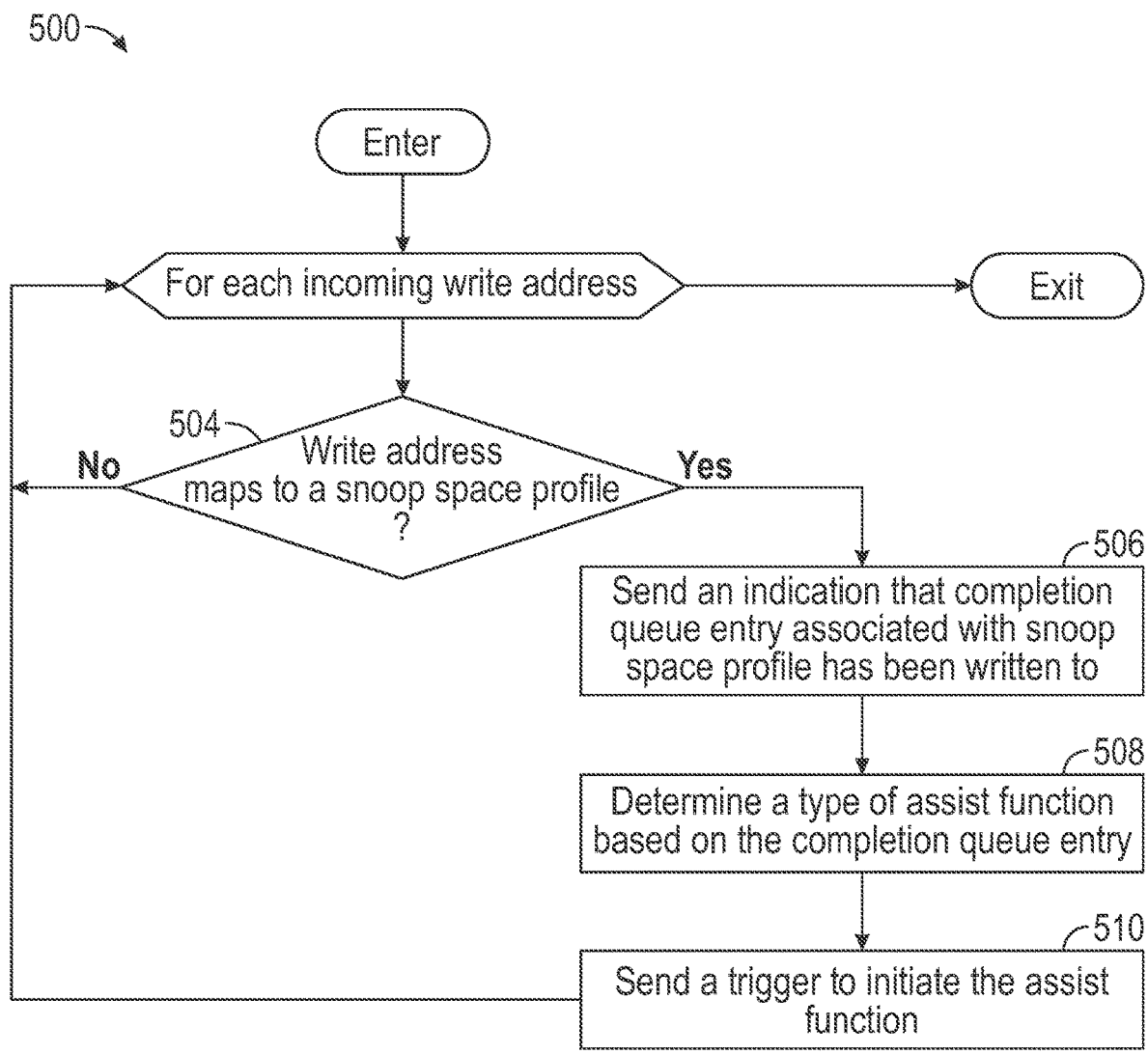
FIG. 5 is a flowchart of another method for snooping input/output (I/O) events in a computing system.

FIG. 5 is a flowchart of a method 500 for snooping I/O events in a computing system. The method 500 may be performed by a snoop logic controller (e.g., snoop logic controller 265). In certain embodiments, the method 500 may be used to implement block 404 of the method 400 depicted in FIG. 4.

For each incoming write address, the snoop logic controller may perform the operations in block 504. At block 504, the snoop logic controller determines whether the write address maps to one of multiple snoop space profiles (e.g., snoop space profiles 340). If not, the method 500 proceeds to evaluate the next incoming write address (e.g., at block 504). On the other hand, if the write address maps to a particular snoop space profile, the method 500 proceeds to block 506.

At block 506, the snoop logic controller sends an indication that a completion queue entry associated with the snoop space profile has been written to. At block 508, the snoop logic controller determines a type of assist function based on the completion queue entry. At block 510, the snoop logic controller sends a trigger (e.g., to firmware) to initiate the assist function.

As used herein, "a processor," "at least one processor," or "one or more processors" generally refers to a single processor configured to perform one or multiple operations or multiple processors configured to collectively perform one or more operations. In the case of multiple processors, performance of the one or more operations could be divided amongst different processors, though one processor may perform multiple operations, and multiple processors could collectively perform a single operation. Similarly, "a memory," "at least one memory," or "one or more memories" generally refers to a single memory configured to store data and/or instructions or multiple memories configured to collectively store data and/or instructions.

While the foregoing is directed to embodiments of the present invention, other and further embodiments of the invention may be devised without departing from the basic scope thereof, and the scope thereof is determined by the claims that follow.

What is claimed is:

1. A computer-implemented method comprising:
   obtaining a configuration comprising a plurality of snoop space profiles, each snoop space profile indicating a respective range of memory addresses that map to a respective completion queue;
   monitoring input/output (I/O) traffic exchanged across a communication interface between an I/O adapter and a processor in a computing system, based on the configuration; and
   performing one or more actions to assist processing of the I/O traffic, based in part on the monitoring.

2. The computer-implemented method of claim 1, wherein monitoring the I/O traffic comprises determining whether an incoming address of the I/O traffic is within the respective range of memory addresses associated with one of the snoop space profiles.

3. The computer-implemented method of claim 2, wherein the determination is that the incoming address is within the respective range of memory addresses associated with one of the snoop space profiles.

4. The computer-implemented method of claim 3, wherein performing the one or more actions comprises sending an indication that a completion queue entry associated with the range of memory addresses has been written to.

5. The computer-implemented method of claim 3, further comprising determining the one or more actions based on a completion queue entry associated with the range of memory addresses that the incoming address is within.

6. The computer-implemented method of claim 5, wherein the one or more actions comprises triggering a count, invoking a timer, or initiating an arrival algorithm.

7. The computer-implemented method of claim 2, wherein the determination is that the incoming address is outside of the respective range of memory addresses for each of the snoop space profiles.

8. The computer-implemented method of claim 7, wherein performing the one or more actions comprises writing a completion queue entry to the incoming address in response to the determination.

9. A computer-readable storage medium having computer-readable program code embodied therewith, the computer-readable program code executable by one or more computer processors to perform an operation comprising:
   obtaining a configuration comprising a plurality of snoop space profiles, each snoop space profile indicating a respective range of memory addresses that map to a respective completion queue;
   monitoring input/output (I/O) traffic exchanged across a communication interface between an I/O adapter and a processor in a computing system, based on the configuration; and
   performing one or more actions to assist processing of the I/O traffic, based in part on the monitoring.

10. The computer-readable storage medium of claim 9, wherein monitoring the I/O traffic comprises determining whether an incoming address of the I/O traffic is within the respective range of memory addresses associated with one of the snoop space profiles.

11. The computer-readable storage medium of claim 10, wherein the determination is that the incoming address is within the respective range of memory addresses associated with one of the snoop space profiles.

12. The computer-readable storage medium of claim 11, wherein performing the one or more actions comprises sending an indication that a completion queue entry associated with the range of memory addresses has been written to.

13. The computer-readable storage medium of claim 11, the operation further comprising determining the one or more actions based on a completion queue entry associated with the range of memory addresses that the incoming address is within.

14. The computer-readable storage medium of claim 13, wherein the one or more actions comprises triggering a count, invoking a timer, or initiating an arrival algorithm.

15. The computer-readable storage medium of claim 10, wherein the determination is that the incoming address is outside of the respective range of memory addresses for each of the snoop space profiles.

16. The computer-readable storage medium of claim 15, wherein performing the one or more actions comprises writing a completion queue entry to the incoming address in response to the determination.

17. A computing system comprising:
   one or more memories;
   an input/output (I/O) adapter;
   one or more processors coupled to the one or more memories and the I/O adapter, the one or more processors being individually or collectively configured to perform an operation comprising:
   obtaining a configuration comprising a plurality of snoop space profiles, each snoop space profile indicating a respective range of memory addresses that map to a respective completion queue;
   monitoring input/output (I/O) traffic exchanged across a communication interface between the I/O adapter and the processor, based on the configuration; and
   performing one or more actions to assist processing of the I/O traffic, based in part on the monitoring.

18. The computing system of claim 17, wherein monitoring the I/O traffic comprises determining whether an incoming address of the I/O traffic is within the respective range of memory addresses associated with one of the snoop space profiles.

19. The computing system of claim 18, wherein the determination is that the incoming address is within the respective range of memory addresses associated with one of the snoop space profiles.

20. The computing system of claim 19, wherein performing the one or more actions comprises sending an indication that a completion queue entry associated with the range of memory addresses has been written to.

* * * * *